(12) United States Patent
Mori et al.

(10) Patent No.: US 7,160,950 B2
(45) Date of Patent: Jan. 9, 2007

(54) MODIFIED OLEFIN COPOLYMER

(75) Inventors: Toshiki Mori, Tsukuba (JP); Nobuo Oi, Narashino (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/485,992

(22) PCT Filed: Aug. 6, 2002

(86) PCT No.: PCT/JP02/08002

§ 371 (c)(1),
(2), (4) Date: Feb. 5, 2004

(87) PCT Pub. No.: WO03/014174

PCT Pub. Date: Feb. 20, 2003

(65) Prior Publication Data

US 2004/0204537 A1 Oct. 14, 2004

(30) Foreign Application Priority Data

Aug. 8, 2001 (JP) ............................ 2001-240720

(51) Int. Cl.
*C08F 132/08* (2006.01)
*C08F 112/04* (2006.01)
*C08F 255/08* (2006.01)

(52) U.S. Cl. ...................... 525/242; 525/285; 525/320; 525/322; 525/236; 525/240; 525/332.1; 525/333.3; 525/241; 526/348

(58) Field of Classification Search ................ 525/242, 525/285, 320, 322, 236, 240, 241, 332.1, 525/333.3; 526/348
See application file for complete search history.

(56) References Cited

U.S. PATENT DOCUMENTS 4,226,965 A * 10/1980 Grigoriev et al. ........... 526/116
4,298,712 A * 11/1981 Machonis et al. ........... 525/74
4,719,260 A * 1/1988 Stuart et al. ................. 525/74
5,414,044 A * 5/1995 Moriya et al. ............... 525/74
6,288,193 B1 * 9/2001 Iseki et al. ............... 526/348.6
6,313,241 B1 * 11/2001 Gauthier et al. ............ 526/160
6,423,807 B1 * 7/2002 Oi et al. ..................... 526/347
6,545,091 B1 * 4/2003 Lee et al. ...................... 525/78

FOREIGN PATENT DOCUMENTS

| EP | 1197501 A2 | 4/2002 |
|---|---|---|
| EP | 1219648 A2 | 7/2002 |
| JP | 59-164316 A | 9/1984 |
| JP | 60-152519 A | 8/1985 |
| JP | 8-217835 A | 8/1996 |
| JP | 9-3124 A | 1/1997 |

* cited by examiner

*Primary Examiner*—James J. Seidleck
*Assistant Examiner*—Olga Asinovsky
(74) *Attorney, Agent, or Firm*—Birch, Stewart, Kolasch & Birch, LLP

(57) ABSTRACT

A modified olefin-based copolymer produced by graft-polymerizing an alkenyl aromatic hydrocarbon and/or an unsaturated carboxylic acid or derivative thereof to an olefin-based copolymer containing repeating units derived from a linear α-olefin and/or ethylene copolymer of ethylene and repeating units derived from a vinyl compound (I) or (II) described below, and an adhesive containing the product as an effective ingredient, in which an adhesiveness to an adherend such as olefin resins (e.g. polyethylene, polypropylene) is further improved, are provided.

Vinyl compound (I): a vinyl compound represented by the general formula $CH_2=CH-R$, wherein steric parameters Es and B1 of the substituent R are respectively −1.64 or less and 1.53 or more.

Vinyl compound (II): a vinyl compound represented by the general formula $CH_2=CH-R'$, wherein a substituent R' is a secondary or tertiary alkyl group.

6 Claims, No Drawings

MODIFIED OLEFIN COPOLYMER

TECHNICAL FIELD

The present invention relates to a modified olefin copolymer, an adhesive containing the modified product as an effective ingredient, a method for adhering a base material with the adhesive, and a laminate prepared by laminating the adhesive and a base material.

BACKGROUND ART

Resins which are excellent in adhesiveness with base materials such as polyethylene and polypropylene, are used widely as adhesives for housings of household appliances, exterior parts of automobiles, paints and the like.

The present inventors have proposed-that olefin-based copolymers of ethylene and/or a linear α-olefin with a vinyl compound having a bulky alkyl group exhibit an excellent adhesiveness (Japanese Patent Application No. 2001-200548). Subjects of the present invention are to provide a resin further improved in adhesiveness to a base material such as olefin-based resins, an adhesive containing the resin as an effective ingredient, a method for adhering a base material with the adhesive, and a laminate prepared by laminating the adhesive and a base material.

DISCLOSURE OF THE INVENTION

A first present invention relates to a modified olefin-based copolymer produced by graft-polymerizing an alkenyl aromatic hydrocarbon and/or an unsaturated carboxylic acid or derivative thereof to an olefin-based copolymer containing repeating units derived from a linear α-olefin and/or ethylene copolymer of ethylene and repeating units derived from a vinyl compound (I) or (II) described below:

Vinyl compound (I): a vinyl compound represented by the general formula $CH_2=CH-R$, wherein steric parameters Es and B1 of the substituent R are respectively −1.64 or less and 1.53 or more.

Vinyl compound (II): a vinyl compound represented by the general formula $CH_2=CH-R'$, wherein a substituent R' is a secondary or tertiary alkyl group.

A second present invention relates to an adhesive containing the modified olefin-based copolymer as an effective ingredient.

A third present invention relates to a adhering method of a base material containing using the above-described adhesive.

A fourth present invention relates to a laminate prepared by laminating the above-described adhesive to a base material.

BEST MODE FOR CARRYING OUT THE INVENTION

The modified olefin-based copolymer of the present invention is a modified product of the olefin-based copolymer produced by graft-polymerizing an alkenyl aromatic hydrocarbon and/or an unsaturated carboxylic acid or derivative thereof to the olefin-based copolymer containing repeating units derived from a linear α-olefin and/or ethylene copolymer of ethylene and repeating units derived from a vinyl compound (I) or (II) described below:

Vinyl compound (I): a vinyl compound represented by the general formula $CH_2=CH-R$, wherein steric parameters Es and B1 of the substituent R are respectively −1.64 or less and 1.53 or more Vinyl compound (II): a vinyl compound represented by the general formula $CH_2=CH-R'$, wherein a substituent R' is a secondary or tertiary alkyl group.

Herein, the "steric parameters Es and B1" are parameters indicative of the steric bulkiness of the substituent R (Es and B1 indicate three-dimensional extent and two-dimensional extent, respectively) and are determined by the method described in literature [C. Hansch and A. Leo: "Exploring QSAR Fundamentals and Applications in Chemistry and Biology" Chapter 3 (ACS Professional Reference Book, Washington, D.C. (1995))].

The vinyl compounds (I) are exemplified and steric parameters thereof are shown below.

| Compound | ES | B1 |
| --- | --- | --- |
| 3-methyl-1-butene | −1.71 | 1.90 |
| 3-methyl-1-pentene | −2.37 | 1.90 |
| Vinylcyclopentane | −1.75 | 1.90 |
| Vinylcyclohexane | −1.81 | 1.91 |
| 4,4-dimethyl-1-pentene | −2.91 | 2.47 |
| 3-ethyl-1-pentene | −3.12 | 2.13 |
| 3,3-dimethyl-1-butene | −2.78 | 2.60 |
| 3,3-dimethyl-1-pentene | −3.40 | 2.60 |
| 3,5,5-trimethyl-1-hexene | −3.09 | 1.90 |
| 3,4-dimethyl-1-pentene | −3.05 | 1.90 |
| 3,4,4-trimethyl-1-pentene | −4.57 | 1.90 |
| 3-ethyl-4-methyl-1-pentene | −4.35 | 1.90 |
| 3,3-dimethyl-4-methyl-1-pentene | −4.66 | 2.60 |

For reference, vinyl compounds having a substituent which is not bulky are exemplified and steric parameters thereof are shown below.

| Compound | ES | B1 |
| --- | --- | --- |
| Propylene | −1.24 | 1.52 |
| 1-butene | −1.31 | 1.52 |
| 1-octene | −1.54 | 1.52 |
| Styrene | −1.01 | 1.71 |

In the present invention, as vinyl compounds (I) and (II), In the present invention, those having more bulky substituent are suitably used.

The steric parameter Es of the substituent R is −1.61 or less, preferably −1.70 or less, more preferably −1.72 or less, particularly −1.75 or less, and the steric parameter B1 of the substituent R is 1.53 or more, preferably 1.70 or more, more preferably 1.91 or more.

From a view point of heightening a polymerization activity of the olefin-based copolymer as an precursor of the modified product, the steric parameter Es of the substituent R of the vinyl compound (I) is preferably −3.10 or more, more preferably −2.80 or more, particularly −2.35 or more, most preferably −2.10 or more, and the steric parameter B1 of the substituent R of the vinyl compound (I) is preferably 2.90 or less, more preferably 2.70 or less, particularly 2.60 or less.

As the vinyl compound (I), those in which the substituent is a hydrocarbon group, preferably the substituent is a saturated hydrocarbon group, are suitable. Further, those in which the substituent is a cyclic alkyl group, are more suitable, and specific examples thereof include vinyl cyclopentane, vinyl cyclohexane and vinyl cyclooctane. Among these, a vinyl compound in which the substituent is a cyclohexyl group is most suitable.

The substituent R' of the vinyl compound (II) is a secondary or tertiary alkyl group, the secondary group is preferably a secondary group having 3 to 20 carbon atoms, and the tertiary group is preferably a tertiary group having 4 to 20 carbon atoms. R' may be a cycloalkyl group, the cycloalkyl group is preferably a cycloalkyl group having a 3 to 16 membered-ring, more preferably a cycloalkyl group having a 3 to 10 membered-ring and having 3 to 20 carbon atoms. As the substituent R', a cycloalkyl group having a 3 to 10 membered-ring and having 3 to 20 carbon atoms, and a tertiary alkyl group having 4 to 20 carbon atoms are preferred.

Specific examples of the vinyl compound (II) include vinylcyclopropane, vinylcyclobutane, vinylcyclopentane, vinylcyclohexane, vinylcycloheptane, vinylcyclooctane, 3-methyl-1-butene, 3-methyl-1-pentene, 3-methyl-1-hexene, 3-methyl-1-heptene, 3-methyl-1-octene, 3,3-dimethyl-1-butene, 3,3-dimethyl-1-pentene, 3,3-dimethyl-1-hexene, 3,3-dimethyl-1-heptene, 3,3-dimethyl-1-octene, 3,4-dimethyl-1-pentene, 3,4-dimethyl-1-hexene, 3,4-dimethyl-1-heptene, 3,4-dimethyl-1-octene, 3,5-dimethyl-1-hexene, 3,5-dimethyl-1-heptene, 3,5-dimethyl-1-octene, 3,6-dimethyl-1-heptene, 3,6-dimethyl-1-octene, 3,7-dimethyl-1-octene, 3,3,4-trimethyl-1-pentene, 3,3,4-trimethyl-1-hexene, 3,3,4-trimethyl-1-heptene, 3,3,4-trimethyl-1-octene, 3,4,4-trimethyl-1-pentene, 3,4,4-trimethyl-1-hexene, 3,4,4-trimethyl-1-heptene, 3,4,4-trimethyl-1-octene, 5-vinyl-2-norbornene, 1-vinyladamantane and 4-vinyl-1-cyclohexene. Preferable vinyl compound (II) includes vinylcyclopentane, vinylcyclohexane, vinylcycloheptane, vinylcyclooctane, 5-vinyl-2-norbornene, 3-methyl-1-butene, 3-methyl-1-pentene, 3-methyl-1-hexene, 3,3-dimethyl-1-butene, 3,3-dimethyl-1-pentene, 3,4-dimethyl-1-pentene, 3,5-dimethyl-1-hexene, 3,3,4-trimethyl-1-pentene, more preferable vinyl compound (II) includes vinylcyclohexane, the the vinylnorbornene, 3-methyl-1-butene, 3-methyl-1-pentene, 3-methyl-1-hexene, 3,3-dimethyl-1-butene, 3,4-dimethyl-1-pentene and 3,3,4-trimethyl-1-pentene.

Further preferable vinyl compound (II) includes vinylcyclohexane and 3,3-dimethyl-1-butene. The most preferable vinyl compound (II) includes vinylcyclohexane.

In the olefin-based copolymer used in the present invention, the content of monomer units of the vinyl compounds (I) and (II) is usually 0.1 to 99 mol % to 100 mol % of all monomer units constituting the olefin-based copolymer, preferably 1 to 90 mol %, particularly preferably 1 to 80 mol % from the viewpoints of a hardness of the modified product of the olefin-based copolymer obtained and adhesiveness of the adhesive.

The contents of monomer units of the vinyl compounds (I) and (II) can be determined using $^1$H-NMR spectrum or $^{13}$C-NMR spectrum.

The linear α-olefin used in the present invention includes linear α-olefins, preferably straight chain α-olefins having 3 to 20 carbon atoms. Specifically, propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, eicocene and the like are listed. Among these, propylene, 1-butene, 1-pentene, 1-hexene and 1-octene are preferred and propylene is more preferred.

In the olefin-based copolymer used in the present invention, the total contents of ethylene units and the straight chain α-olefin units are usually 1 to 99.9 mol % to 100 mol % of all monomer units constituting the olefin-based copolymer, preferably 10 to 99 mol %, particularly preferably 20 to 99 mol %.

The olefin-based copolymer used in the present invention, is prepared by copolymerizing ethylene and/or the straight chain α-olefin with the vinyl compound (I) or (II), further an addition-polymerizable monomer may be copolymerized therewith. Herein, the addition-polymerizable monomer is a monomer excluding ethylene, the straight chain α-olefins, and the vinyl compounds (I) or (II), and copolymerizable therewith and the carbon number of the monomer is about 3 to about 20.

Specific examples of the addition-polymerizable monomer include cyclic olefins, vinylidene compounds represented by the general formula (III):

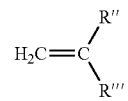

(in the formula, respective R" and R''' are independently represent a straight chain, branched chain or cyclic alkyl group having 1 to about 18 carbon atoms, halogen atom or the like.), diene compounds, halogenated vinyl compounds, alkylic acid vinyl compounds, vinylethers, acrylonitriles and the like.

The cyclic olefins include for example, cyclobutene, cyclopentene, cyclohexene, cyclooctene, 3-methylcyclopentene, 4-methylcyclopentene, 3-methylcyclohexene, 2-norbornene, 5-methyl-2-norbornene, 5-ethyl-2-norbornene, 5-butyl-2-norbornene, 5-phenyl-2-norbornene, 5-benzyl-2-norbornene, 2-tetracyclododecene, 2-tricyclodecene, 2-tricycloundecene, 2-pentacyclopentadecene, 2-pentacyclohexadecene, 8-methyl-2-tetracyclododecene, 8-ethyl-2-tetracyclododecene, 5-acetyl-2-norbornene, 5-acetyloxy-2-norbornene, 5-methoxycarbonyl-2-norbornene, 5-ethoxycarbonyl-2-norbornene, 5-methyl-5-methoxycarbonyl-2-norbornene, 5-cyano-2-norbornene, 8-methoxycarbonyl-2-tetracyclododecene, 8-methyl-8-methoxycarbonyl-2-tetracyclododecene, and 8-cyano-2-tetracyclododecene. More preferable cyclic olefins include cyclopentene, cyclohexene, cyclooctene, 2-norbornene, 5-methyl-2-norbornene, 5-phenyl-2-norbornene, 2-tetracyclododecene, 2-tricyclodecene, 2-tricycloundecene, 2-pentacyclopentadecene, 2-pentacyclohexadecene, 5-acetyl-2-norbornene, 5-acetyloxy-2-norbornene, 5-methoxycarbonyl-2-norbornene, 5-methyl-5-methoxycarbonyl-2-norbornene and 5-cyano-2-norbornene, and 2-tetracyclododecene and 2-norbornene are particularly preferable.

The vinylidene compounds include, for example, isobutene, 2-methyl-1-butene, 2-methyl-1-pentene, 2-methyl-1-hexene, 2-methyl-1-heptene, 2-methyl-1-octene, 2,3-dimethyl-1-butene, 2,3-dimethyl-1-pentene, 2,3-dimethyl-1-hexene, 2,3-dimethyl-1-heptene, 2,3-dimethyl-1-octene, 2,4-dimethyl-1-pentene, 2,4,4-trimethyl-1-pentene and vinylidene chloride. Particularly preferable vinylidene compounds are isobutene, 2,3-dimethyl-1-butene and 2,4,4-trimethyl-1-pentene. Diene compounds include 1,3-butadiene, 1,4-pentadiene, 1,5-hexadiene, 1,6-heptadiene, 1,7-octadiene, 1,5-cyclooctadiene, 2,5-norbornadiene, dicyclopentadiene, 5-vinyl-2-norbornene, 5-allyl-2-norbornene, 4-vinyl-1-cyclohexene and 5-ethylidene-2-norbornene. Particularly preferable diene compounds are 1,4-pentadiene, 1,5-hexadiene, 1,6-heptadiene, 2,5-norbornadiene, dicyclopentadiene, 5-vinyl-2-norbornene, 4-vinyl-1-cyclohexene and 5-ethylidene-2-norbornene Vinyl alkylates include, for example, vinyl acetate, vinyl propionate and vinyl butyrate. Vinyl ethers include, for example, methyl vinyl ether, ethyl vinyl ether and butyl vinyl ether. Halogenated vinyls include, for example, vinyl chloride. Acrylonitriles include, for example, acrylonitrile and methacrylonitrile.

The content of the addition polymerizable monomer units in the olefin-based copolymer is usually within a range not damaging an adhesiveness to propylene of a adhesive obtained, the specific content is about 5 mol % or less and preferably 1 molt or less to 100 mol % of all monomer units constituting the olefin-based copolymer, and particularly preferably a content in a degree not substantially containing the addition polymerizable monomer units.

As a producing method of the copolymer used in the present invention, there are listed methods of copolymerizing ethylene and/or the α-olefin with the vinyl compound (I) and/or (II) in the presence of a catalyst obtained by contacting isopropylidenebis(indenyl)zirconium dichloride and methylalumoxane. Among these, a producing method according to a method described in JP 2000-311778 A is preferably adopted.

The copolymer in the present invention has a structure in which mutual tertiary carbon atoms derived from the vinyl compound (I) and/or the vinyl compound (II), are separated by one methylene group derived from the vinyl compound (I) and/or the vinyl compound (II). For example, a copolymer of ethylene with vinylcyclohexane, has a structure in which mutual carbon atoms connected to a cyclohexyl group are separated by one methylene group. Of course, it may have a structure in which said carbon atoms are mutually separated by 2 or 3 or more methylene groups.

The above-described structure can be confirmed by a $^{13}$C-NMR analysis of the vinyl compound polymer.

A molecular weight distribution (Mw/Mn=[weight average molecular weight]/[number average molecular weight]) of the olefin-based copolymer used in the present invention is usually 1.5 to 10.0, preferably 1.5 to 7.0, particularly preferably 1.5 to 5.0. When the molecular weight distribution of the olefin-based copolymer is too narrow or too broad, a mechanical strength or transparency of the adhesive obtained have an improvement tendency, therefore it is preferable.

Besides, in the present specification, the weight average molecular weight (Mw) and the number average molecular weight are values determined by using a gel permeation chromatograph (GPC) and calibrating with polystyrene (molecular weight 688 to 400,000) standard substance.

Further, from a viewpoint of a mechanical strength, the weight average molecular weight (Mw) of the olefin-based copolymer is usually 5,000 to 1,000,000, preferably 10,000 to 500,000, particularly preferably 15,000 to 400,000. When the weight average molecular weight (Mw) of the olefin-based copolymer is large, the mechanical strength of an adhesive obtained has an improvement tendency, therefore, it is preferable, and when the weight average molecular weight (Mw) of the olefin-based copolymer is low, the moldability of the olefin-based copolymer has an improvement tendency, therefore it is preferable.

Moreover, from the viewpoint of mechanical strength, the olefin-based copolymer used in the present invention has usually an intrinsic viscosity [η] of about 0.08 to about 10.0 dl/g, preferably about 0.10 to about 3.0 dl/g, particularly preferably about 0.15 to about 2.0 dl/g.

The modified olefin-based copolymer in the present invention is a modified product prepared by graft-polymerizing an alkenyl aromatic hydrocarbon and/or an unsaturated carboxylic acid or derivative thereof to the olefin-based copolymer thus obtained. The modified product prepared by graft-polymerizing an alkenyl aromatic hydrocarbon to the olefin-based copolymer is firstly explained. A content of the alkenyl aromatic hydrocarbon in the modified product is usually 0.01 to 30% by weight, preferably 0.05 to 10% by weight, particularly 0.1 to 5% by weight to 100% by weight of the modified product of the olefin-based copolymer. When the graft-polymerized amount of the alkenyl aromatic hydrocarbon is large, the adhesiveness of the modified product has a tendency of improvement. Further, when the graft-polymerized amount of the alkenyl aromatic hydrocarbon is smaller than that in this range, the heat stability of the modified product has a tendency of improvement.

As the alkenyl aromatic hydrocarbon used in the present invention, for example, an alkenyl compounds having 6 to 25 carbon atoms are listed, specifically alkenyl compounds such as a phenyl group, tolyl group, xylyl group, the third grade butyl phenyl group, vinyl phenyl group, naphthyl group, phenanthryl group and anthracenyl group are listed. Among these alkenyl aromatic compounds, alkenyl aromatic compounds having a phenyl group, tolyl group, xylyl group, tertiary butyl phenyl group, vinyl phenyl group and naphthyl group are desirable. Specific example of the alkenyl aromatic hydrocarbon include styrene, alkyl styrene such as p-methylstyrene, m-methylstyrene, o-methylstyrene, p-ethyl styrene, m-ethyl styrene, o-ethyl styrene, 2,4-dimethylstyrene, 2,5-dimethylstyrene, 3,4-dimethylstyrene, 3,5-dimethylstyrene, 3-methyl-5-ethyl styrene, p-tert-butylstyrene, and p-sec-butylstyrene; alkenylbenzenes such as 2-phenyl propylene, 2-phenyl butene; vinylnaphthalenes such as 1-vinylnaphthalene. As the alkenyl aromatic hydrocarbon, 2 or more of the alkenyl aromatic hydrocarbon may be used.

Among the alkenyl aromatic hydrocarbons, styrene, p-methylstyrene, m-methylstyrene, o-methylstyrene, p-tert-butylstyrene, and 1-vinylnaphthalene are preferable, and particularly styrene is preferably applied.

Next, the modified product prepared by graft-polymerizing an unsaturated carboxylic acid or derivative thereof to the olefin-based copolymer is explained. A graft-polymerized amount of the unsaturated carboxylic acid or derivative thereof to 100% by weight of the modified olefin-based copolymer is usually 0.01 to 20% by weight, preferably 0.05 to 10% by weight, particularly 0.1 to 5% by weight. When the graft-polymerized amount of the unsaturated carbbxylic acid is large, an adhesiveness of the modified product has a tendency of improvement, and when the graft-polymerized amount of the unsaturated carboxylic acid or derivative thereof is small, a heat stability of the modified product has a tendency of improvement.

The unsaturated carboxylic acid or derivative thereof used in the present invention includes, for example, unsaturated carboxylic acid such as acrylic acid, methacrylic acid, crotonic acid, isocrotonic acid, maleic acid, fumaric acid, itaconic acid, citraconic acid, nadic acid, methylnadic acid, himic acid, angelic acid, tetrahydro phthalic acid, sorbic acid, measaconic acid; unsaturation carboxylic acid anhydride such as maleic anhydride, itaconic anhydride, citraconic anhydride, nadic anhydride, methylnadic anhydride, himic anhydride; unsaturated carboxylic acid ester such as methyl acrylate, methyl methacrylate, ethyl acrylate, ethyl methacrylate, n-butyl acrylate, n-butyl methacrylate, iso-butyl acryllate, iso-butyl methacrylate, glycidy acrylate, glycidyl methacrylate, maleic acid monoethyl ester, maleic acid diethyl ester, monomethyl fumarate ester, fumaric acid dimethylester, itaconic acid monomethyl ester, itaconic acid dimethylester; unsaturated carboxylic acid amide such as acrylamide, methacrylamide, maleic acid monoamide, maleic acid diamide, maleic acid-N-mono ethylamide, maleic acid-N,N-diethylamide, maleic acid-N-monobutylamide, maleic acid-N,N-dibutylamide, fumaric acid monoamide, fumaric acid diamide, fumaric acid-N-monoethylamide, fumaric acid-N,N-diethylamide, fumaric acid-N-monobutylamide, fumaric acid-N,N-dibutyl amide; unsaturated carboxylic acid imide such as maleimide, N-butyl maleimide, N-phenylmaleimide; unsaturated carboxylic acid halide such as chlorinated maleoyl; and unsaturated metal carboxylate such as sodium acrylate, methacrylate sodium, acryl potassium, methacrylic acid potassium. Further, the above-described unsaturated carboxylic acids or derivatives thereof may be used in combination. As the unsaturated carboxylic acid or derivative thereof, among them, maleic anhydride is preferable.

As a producing method of the modified olefin-based copolymer, for example, there are a method of adding and graft-polymerizing an alkenyl aromatic hydrocarbon and/or an unsaturated carboxylic acid or derivative thereof after melting the olefin-based copolymer, a method of adding and graft-polymerizing an alkenyl aromatic hydrocarbon and/or an unsaturated carboxylic acid or derivative thereof after dissolving the olefin-based copolymer with a solvent such as toluene or xylene, and the like. The producing method described above is usually carried out at a temperature of about 40 to about 350° C.

Polymerization is usually carried out in the presence of a radical initiator for graft-polymerizing an alkenyl aromatic hydrocarbon and/or an unsaturated carboxylic acid or derivative thereof to the olefin-based copolymer. The used amount of the radical initiator is usually 0.001 to 0.5 mol, preferably 0.005 to 0.1 mol per 1 kg of the olefin-based copolymer.

The radical initiator includes, for example, organic peroxides such as methyl ethyl ketone peroxide, cyclohexanone peroxide, 3,3,5-trimethylcyclohexanone peroxide, methylcyclohexanone peroxide, methyl acetoacetate peroxide, acetylacetone peroxide, 1,1-bis(tert-butyl peroxy)-3,3,5-trimethylcyclohexane, 1,1-bis(tert-butyl peroxy)cyclohexane, 2,2-bis(tert-butyl peroxy)octane, n-butyl-4,4-bis(tert-butyl peroxy)valerate. 2,2-bis(tert-butyl peroxy)butane, tert-butyl hydroperoxide, cumene hydroperoxide, diisopropylbenzene hydroperoxide, paramentane hydroperoxide, 2,5-dimethyl-hexane-2,5-dihydroperoxide, 1,1,3,3-tetramethylbutylhydroperoxide, di-tert-butyl peroxide, tert-butyl cumyl peroxide, dicumylperoxide, α,α'-bis(tert-butyl peroxy-m-isopropyl)benzene, 2,5-dimethyl-2,5-di(tert-butyl peroxy) hexane, 2,5-dimethyl-2,5-di(tert-butyl peroxy)-3-hexyne, 1,4-bis(tert-butylperoxyisopropyl)benzene, acetylperoxide, isobutylyl peroxide, octanoyl peroxide, decanoyl peroxide, lauroyl peroxide, 3,5,5-trimethyhexanoyl peroxide, succinic acid peroxide, benzoyl peroxide, 2,4-dichlorobenzoyl peroxide, m-tolnoyl peroxide, diisopropyl peroxydicarbonate, di-2-ethylhexyl peroxydicarbonate, di-n-propyl peroxydicarbonate, bis(1-tert-butylcyclohexyl)peroxydicarbonate, dimyristyl peroxydicarbonate, di-2-ethoxyethyl peroxydicarbonate, dimethoxyisopropyl peroxydicarbonate, di(3-methyl-3-methoxybuty)peroxydicarbonate, diallyl peroxydicarbonate, tert-butyl peroxyacetate, tert-butyl peroxyisobutylate, tert-butyl peroxypivalate, tert-butyl peroxyneodecanoate, cumyl peroxyneodecanoate, tert-butyl peroxy-2-ethylhexanoate, tert-butyl peroxy-3,5,5-trimethylhexanoate, tert-butylperoxylaurate, tert-butylperoxybenzoate, di-tert-butylperoxyisophthalate, 2,5-dimethyl-2,5-di (benzoyl peroxy)-3-hexane, 2,5-dimethyl-2,5-di(benzoyl peroxy)-3-hexyne, tert-butyl peroxy maleic acid, tert-butyl peroxy isopropyl carbonate, cumyl peroxyoctanoate, tert-hexyl peroxydecanoate, tert-hexylperoxypivalate, tert-hexylperoxyhexanoate, cumylperoxyneohexanoate, acetylcyclohexylsulfonylperoxide, tert-butylperoxyallylcarbonate; and azo compounds such as azobisisobutyronitrile, azobisisopropionitrile, dimethyl azoisobutylate.

The modified olefin-based copolymer in the present invention usually has 1.5 to 10 of a molecular weight distribution(Mw/Mn), preferably 1.5 to 7, particularly 1.5 to 5. When the molecular weight distribution is narrow, the adhesiveness of the modified product has a tendency of improvement in adhesion. The molecular weight distribution of the modified product can be measured in the same manner as in the molecular weight distribution of the above-described of the molecular weight distribution.

An intrinsic viscosity [η] of the modified olefin-based copolymer in the present invention usually 0.08 to 10.0 dl/g, preferably 0.1 to 3.0 dl/g, particularly preferably 0.15 to 2.0 dl/g from the view point of mechanical strength. Thus obtained olefin-based modified products can be used as, for example, adhesives, tackifiers, modifiers of adhesives, heat-sealing agents, paints, primers for paints, films, sheets, construction materials, building materials, automobile parts, electric- or electronic products and packaging materials. Among them, those are used preferably as adhesives, tackifiers, modifiers of adhesives, heat-sealing agents, paints, and primers for paints from the excellent adhesiveness, particularly as adhesives.

The adhesive of the present invention is an adhesive containing the modified olefin-based copolymer as an effective ingredient, and may contain stabilizers such as phenol type stabilizers, phosphite type stabilizers, amine type stabilizers, amide type stabilizers, aging preventing agents, weathering stabilizers, precipitation preventing agents, antioxidants, and thermal stabilizers light stabilizers; additives such as thixotropic agents, viscosity improvers, de-foaming agents, surface controlling agents, weathering agents, pigments, pigment dispersants, antistatic agents, lubricants, nucleating agents, flame retardants, oiling agents, and dyes; pigments such as a transition metal compounds (e.g. titanium oxide (rutile type), zinc oxide), carbon black; and inorganic or organic fillers such as glass fiber, carbon fiber, potassium titanate fiber, wollastnite, calcium carbonate, calcium sulfate, talc, glass flakes, barium sulfate, clays, kaolin, fine powdered silica, mica, calcium silicate, aluminum hydroxide, magnesium hydroxide, aluminum oxide, magnesium oxide, alumina, and celite. Further, the adhesive may contain a solvent such as water, an aromatic solvent (e.g. toluene, xylene), an aliphatic solvent (e.g. hexane), an ester (e.g. ethyl acetate, butyl acetate), a ketone (e.g. methyl ethyl ketone, methyl isobutyl ketone), and an alcohol (e.g. methanol, isopropyl alcohol, ethylene glycol, propylene glycol). The content of the solvent in the adhesive is usually about 1.5 to about 30 parts by weight, preferably about 2 to about 20 parts by weight. When the adhesive contains the solvent, the modified olefin-based copolymer, stabilizers, additives, pigments, fillers and the like may be dissolved or dispersed in the solvent.

The laminate of the present invention is one prepared by laminating a base material and the adhesive of the present invention. The base material include, for example, olefin-based resins such as polypropylenes, polyethylenes, ethylene-propylene copolymers, ethylene-propylene-diene copolymers, and styrene-butadiene-styrene copolymers; thermoplastic resins containing polar groups such as polyesters, polyvinyl chlorides, polyamide resins, (meth)acrylate resins, ethylene-(meth(acrylate resins and ethylene-vinyl acetate resins; thermosetting resins containing polar groups such as epoxy resins, urethane resins, and urea resins; inorganic materials such as metals, glass, and cements; and cellulose polymer materials such as papers and woods. Further, in the laminate, two or more of different materials may be used. Among the materials, thermoplastic resins containing polar groups and olefin-based resins are preferable, and polypropylenes are particularly preferable.

The base material may contain the above-described stabilizer, additive, pigment, fillers, solvent and the like. A form of the base material includes, for example, a form such as solutions containing a pigment, a solvent and the like in the thermoplastic resin containing polar groups or thermosetting resin containing polar groups; and films or sheets such as decorated films; and the like. Among them, the solution-like base material prepared by containing the pigment, the solvent and the like in the thermoplastic resin containing polar groups or thermosetting resin containing polar groups as a paint, may be laminated. As the paint, the thermoplastic resin containing polar groups and thermosetting resin containing polar groups may be mixed and used.

Further, the paint obtained may be coated several times. Furthermore, as the base material, a film or sheet of the olefin-based resin or a hydrogenated product obtained by hydrogenating backbone olefin bonds thereof is also preferably applied.

Producing methods of the laminates include, for example, a method of piling a base material, a sheet-like adhesive and a base material in this order and then hot-pressing them; a method of coating a solution-like adhesive on a base material, drying it and then laminating another base material; a method of adhering and laminating by coating a solution-like adhesive and a solution-like base material on a base material and then heating them; and a method of laminating by co-extruding a base material, sheet-like adhesive and a base material.

The present invention is explained in more detail by showing Examples below, but not limited thereto. In the Examples, "part" and "%" mean weight if no denial.

An intrinsic viscosity [η] was measured using an Ubbellode viscometer at 135° C. in a tetralin solvent.

A molecular weight of an olefin-based copolymer or a modified product of the olefin-based copolymer determined by using a gel permeation chromatograph (GPC) under the below-described conditions, and calibrating the measuring results with standard polystyrenes (molecular weight 688 to 400,000). In addition, a molecular weight distribution was evaluated as a ratio (Mw/Mn) of a weight average molecular weight (hereinafter, referred to as "Mw") to a number average molecular weight (hereinafter, referred to as "Mn").

Type: 150-C manufactured by Waters Co., Ltd.
Column: Shodex packed column A-80M
Measuring temperature: 140° C.
Measuring solvent: o-dichlorobenzene
Measuring concentration: 1 mg/ml A content of vinylcyclohexane units in the olefin-based copolymer was determined by using a $^{13}$C-NMR apparatus described below.

$^{13}$C-NMR apparatus: DRX600 manufactured by BRUKER Co., Ltd.
Measuring solvent: a mixed solvent of o-dichlorobenzene and o-dichlorobenzene-d4(volume ratio; 4:1)
Measuring temperature: 135° C.

An content of maleic anhydride was determined by dissolving a sample in a small amount with hot xylene, purifying it through precipitation with anhydrous acetone, preparing a xylene solution by dissolving the sample again, and then titrating with a 0.01 mol-NaOH methanol solution under heating (110–120° C.) using a phenolphthalein indicator. In addition, the content of maleic anhydride was calculated as a dibasic acid.

EXAMPLE 1

<Preparation of Base Material>

A film of 100 μm-thick was obtained by using polypropylene (Noblen AY564 manufactured by Sumitomo Chemical Company, Ltd.) and forming a film with a Laboplastomill (20 mm ϕ extruder equipped with a T-die, manufactured by Toyo Seiki, Ltd.) and used as a base material.

Further, a formed sheet of 2 mm-thick was obtained by molding a similar polypropylene similar to that as above with a 5.5 ounce injection machine (IS100E, manufactured by Toshiba Ltd.) and used as another base material.

<Production of Olefin-Based Copolymer>

Into an autoclave having an atmosphere replaced with argon, 441 parts of vinylcyclohexane and 1241 g of dehydrated toluene were charged. After heating to 30° C., propylene was charged therein to 0.4 MPa.

Further, 14 parts of a solution of methylalumoxane in toluene [MMAO produced by Tosoh Akzo Corp., Al atom converted concentration=6 wt %] and a previously prepared mixture of a solution of 0.0087 parts of isopropylidenebis (indenyl) zirconium dichloride (manufactured by Boulder, Ltd.) dissolved in 8 parts of dehydrated toluene and 1 part of the foregoing toluene solution of methylalumoxane were charged and stirred for 40 minutes. The reaction liquid was poured into about 5000 parts of methanol, and a precipitated white solid was collected through filtration.

The solid was washed with methanol and then dried under reduced pressure, to obtain 243 parts g of a propylene-vinylcyclohexane copolymer (B-1).

An [η] of the copolymer (B-1) was 0.18 dl/g, Mn was 10,000, a molecular weight distribution (Mw/Mn) was 2.1, a melting point (Tm) was 116° C., a glass transition point was −5° C., and a content of the VCH units in the copolymer (B-1) was 3 mol %.

<Synthesis of Modified Product of Olefin-Based Copolymer>

200 Parts of xylene and 25 parts of the copolymer (B-1) were charged into a pressure-resistance reaction vessel, the inner atmosphere of the vessel was replaced with nitrogen, and the resulted solution was stirred for 1 hour after heated to 140° C. to obtain a homogenous xylene solution of the copolymer (B-1). Subsequently, a solution of which 25 parts of maleic anhydride were dissolved with 200 parts of xylene, and a solution of which 1.48 parts of 2,5-dimethyl-2,5-di (tert-butylperoxy)hexane were dissolved in 30 parts of xylene, were separately fed into the reaction vessel through introducing pipes over 4 hours. The resultant was cooled to near room temperature after stirred additionally for two hours. Thus obtained reaction liquid was dropped into a large amount of acetone and filtered matters containing an objective maleic acid-modified product of the propylene-vinylcyclohexane copolymer (B-2) were obtained.

The filtered matters were dried under reduced pressure at 80° C. for 12 hours to obtain 17.6 parts of the modified product (B-2).

A grafted amount of maleic anhydride in this modified product (B-2) was 2.12%, and as a result of measurement by GPC, a weight average molecular weight (Mw) was 20,000, a number average molecular weight (Mn) was 10,000 and a molecular weight distribution (Mw/Mn) was 2.0.

<Production of Adhesive and Laminate>

A pile of a steel plate (4 mm-thick)/an aluminum plate (200 μm)/a polytetrafluoroethylene sheet (200 μm)/(B-2)+50 μm PET (polyethylene terephthalate) frame/a polytetrafluoroethylene sheet (200 μm)/an aluminum plate (200 μm)/a steel plate (4 mm-thick) was pressed, and then polytetrafluoroethylene sheets were separated to obtain a sheet-like adhesive in which the (B-2) was an effective ingredient.

Next, an aluminum foil, a base material (a polypropylene sheet of 2 mm-thick), the sheet-like adhesive, abase material (a polypropylene sheet of 2 mm-thick) and an aluminum foil were sequentially piled from the upper side, and were maintained for 3 seconds at a temperature of 180° C. under a pressure of 0.3 MPa from the upper side to adhere a part of the pile (25 mm-width). The aluminum foils of both sides of a laminate obtained were peeled off, then the resulted laminate was allowed to stand for 1 hour at a temperature of 23° C. and a humidity of 50%. Thereafter, the laminate was cut to 10 mm-width×100 mm-length (adhered length 25 mm) in size, then a part not adhered thereof was held at a temperature of 23° C. and a humidity of 50%, and a peel test was carriedout at peeling rate 100 mm/second and a peeled angle of 180°. As the result, a peel strength to polypropylene was 8.6 (N/10 mm). The results are gathered in Table 1.

EXAMPLE 2

A production of an olefin-based copolymer was carried out in the same manner as in Example 1 except that 441 parts of vinylcyclohexane, 1241 parts of toluene, 14 parts of the toluene solution of methylalumoxane[MMAO produced by Tosoh Akzo Corp., Al atom converted concentration=6 wt %], 0.0087 parts of isopropylidenebis(indenyl)zirconium dichloride (manufactured by Boulder, Ltd.) dissolved in 8 parts of dehydrated toluene, and the stirring time of 40 minutes were changed to 110 parts of vinylcyclohexane, 43 parts of toluene, 5 parts of the toluene solution of methylalumoxane, 0.0043 parts of isopropylidenebis(indenyl)zirconium dichloride (manufactured by Boulder, Ltd.) dissolved in 8 parts of dehydrated toluene, and the stirring time of 60 minutes, respectively. Results are shown in Table 1.

In addition, an amount of a obtained propylene-vinylcyclohexane copolymer was 45 parts, an [η] of the copolymer was 0.16 dl/g, Mn was 9,000, a molecular weight distribution (Mw/Mn) was 2.2, a melting point (Tm) was 93° C., a glass transition point was −8° C., and a content of the VCH units in the copolymer was 7.6 mol %.

EXAMPLE 3

A production of an olefin-based copolymer was carried out in the same manner as in Example 1 except that 441 parts of vinylcyclohexane, 1241 parts of toluene, 14 parts of the toluene solution of methylalumoxane [MMAO produced by Tosoh Akzo Corp., Al atom converted concentration=6 wt %], and the stirring time of 40 minutes were changed to 110 parts of vinylcyclohexane, 37 parts of toluene, 10 parts of the toluene solution of methylalumoxane, and the stirring time of 90 minutes, respectively. Results are shown in Table 1.

In addition, an amount of a obtained propylene-vinylcyclohexane copolymer was 83 parts, an [η] of the copolymer was 0.14 dl/g, Mn was 7,000, a molecular weight distribution (Mw/Mn) was 2.3, a melting point (Tm) was 97° C., a glass transition point was 3° C., and a content of the VCH units in the copolymer was 13 mol %.

COMPARATIVE EXAMPLE 1

The olefin-based copolymer obtained in Example 1 was processed in the same manner as in Example 1 to produce a sheet-like adhesive. Subsequently, a laminate was produced in the same manner as in Example 1, and a peel strength thereof was measured. The result was shown in Table 1.

COMPARATIVE EXAMPLE 2

The olefin-based copolymer obtained in Example 2 was processed in the same manner as in Example 1 to produce a sheet-like adhesive. Subsequently, a laminate was produced in the same manner as in Example 1, and a peel strength thereof was measured. The result was shown in Table 1.

COMPARATIVE EXAMPLE 3

The olefin-based copolymer obtained in Example 3 was processed in the same manner as in Example 1 to produce a sheet-like adhesive. Subsequently, a laminate was produced in the same manner as in Example 1, and a peel strength thereof was measured. The result was shown in Table 1.

COMPARATIVE EXAMPLE 4

<Production of Olefin-Based Copolymer>

While maintaining an inner temperature of an autoclave (reaction vessel) at 50° C., hexane at a rate of 84.7 parts/hour, ethylene at a rate of 2.8 parts/hour and styrene at a rate of 4.15 parts/hour were continuously fed from a lower part of the reaction vessel. As a catalyst, isopropylidenebis (cyclopentadienyl)(3-tert-butyl-5-methyl-2-phenoxy)titanium dichloride, N,N-dimethylaniliniumtetrakis(pentafluorophenyl)borate and triisobutylaluminum were continuously fed from a lower part at rates of 0.000348, 0.001081 and 0.006912 parts per hour, respectively. In addition, a polymerization liquid was continuously taken out from a upper part of the reaction vessel so that the volume of the polymerization liquid in the polymerization vessel became equal to the inner volume of the polymerization vessel. A small amount of methanol was added to the polymerization liquid taken out from the polymerization vessel to terminate the polymerization, and an olefin-based copolymer was taken out by removing the solvent through steam stripping in a large amount of water after de-monomers and water-washing, and dried at 80° C. over night and day. The olefin-based copolymer obtained above was processed in the same manner as in Example 1 to produce a sheet-like adhesive. Subsequently, a laminate was produced in the same manner as in Example 1, and a peel strength thereof was measured. The result was shown in Table 1.

TABLE 3

| | | | Example | | | Comparative Example | | | |
|---|---|---|---|---|---|---|---|---|---|
| | | | 1 | 2 | 3 | 1 | 2 | 3 | 4 |
| Modified product of olefin-based copolymer | olefin-based copolymer | Kind | Propylene (97) | Propylene (92.4) | Propylene (87) | Propylene (97) | Propylene (92.4) | Propylene (87) | Propylene (84) |
| | | Kind (mol %) | VCH (3) | VCH (7.6) | VCH (13) | VCH (3) | VCH (7.6) | VCH (13) | Styrene (16) |
| | | Es | −1.81 | −1.81 | −1.81 | −1.81 | −1.81 | −1.81 | −1.01 |
| | | B | 1.91 | 1.91 | 1.91 | 1.91 | 1.91 | 1.91 | 1.71 |
| | Maleic anhydride Grafted amount (wt %) | | 2.12 | 2.82 | 1.74 | 0 | 0 | 0 | 0 |
| | | Mn | 10,000 | 9,000 | 9,000 | 10,000 | 9,000 | 7,000 | 204,000 |
| | | Mw/Mn | 2.0 | 2.0 | 1.7 | 2.2 | 2.2 | 2.3 | 2.9 |
| Peel strength of laminate | | | 8.6 | 8.5 | 9.6 | 5.9 | 2.6 | 2.7 | 1.9 |

The modified olefin-based copolymer of the present invention can be used as, for example, adhesives, tackifiers, modifiers for adhesives, heat-sealing agents, paints, primers for paints, sheets, construction materials, building materials, automobile parts, electric/electronic parts, and packaging materials.

The adhesive of the present invention has markedly excellent adhesiveness to base materials such as polyolefin resins (e.g. polypropylene).

The adhesive of the present invention can be utilized for packaging materials, building materials, housings of household appliances, polypropylene laminates for automobile exterior such as bumpers, door moles, door mirrors, and door under-covers by, for example, laminating a decorated film on the adhesive of the present invention, or coating a paint thereon.

The invention claimed is:

1. A modified olefin-based copolymer produced by a process comprising graft-polymerizing an alkenyl aromatic hydrocarbon and/or an unsaturated carboxylic acid or derivative thereof to an olefin-based copolymer containing repeating units derived from a linear α-olefin having 3 to 20 carbon atoms and/or ethylene as an olefin and repeating units derived from vinylcyclohexane, wherein contents of the repeating units derived from the olefin and the repeating units derived from vinylcyclohexane are respectively 20 to 99 mol% and 1 to 80 mol% based on 100 mol% of the total monomer units constituting the olefin-based copolymer, an amount of the alkenyl aromatic hydrocarbon and/or the unsaturated carboxylic acid or derivative thereof is 0.05 to 10% by weight based on the modified olefin-based copolymer.

2. The modified olefin-based copolymer according to claim 1, wherein the olefin-based copolymer is an olefin-based copolymer of ethylene and vinylcyclohexane.

3. The modified olefin-based copolymer according to claim 1, wherein the olefin-based copolymer is an olefin-based copolymer of propylene and vinylcyclohexane.

4. The modified olefin-based copolymer according to claim 1, wherein the alkenyl aromatic hydrocarbon is styrene and the unsaturated carboxylic acid or derivative thereof is maleic anhydride.

5. An adhesive containing the modified olefin-based copolymer of claim 1 as an effective ingredient.

6. A laminate prepared by adhering the adhesive of claim 5 to a base material.

* * * * *